No. 624,373. Patented May 2, 1899.
H. OLSON.
WHIFFLETREE HOOK.
(Application filed Sept. 24, 1898.)
(No Model.)
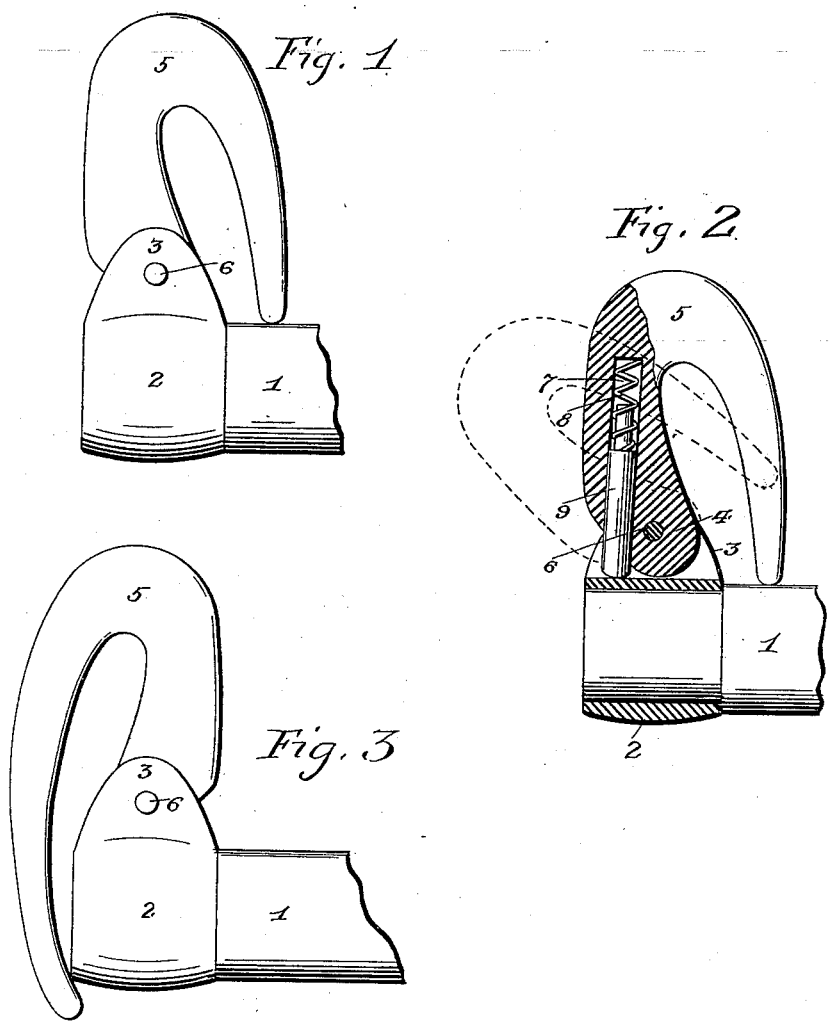
Witnesses
Thomas Lloyd Jenkins
Benj. F. Conl.
Inventor
Hakan Olson,
by H. B. Willson & Co
Attorneys
THE NORRIS PETERS CO., PHOTO-LITHO., WASHINGTON, D. C.

UNITED STATES PATENT OFFICE.

HAKAN OLSON, OF SOPERVILLE, ILLINOIS.

WHIFFLETREE-HOOK.

SPECIFICATION forming part of Letters Patent No. 624,373, dated May 2, 1899.

Application filed September 24, 1898. Serial No. 691,808. (No model.)

*To all whom it may concern:*

Be it known that I, HAKAN OLSON, a citizen of the United States, residing at Soperville, in the county of Knox and State of Illinois, have invented certain new and useful Improvements in Automatic Whiffletree-Hooks; and I do declare the following to be a full, clear, and exact description of the invention, such as will enable others skilled in the art to which it appertains to make and use the same.

My invention relates to improvements in whiffletree-hooks; and the object is to provide a simple, inexpensive, and safe, as well as durable, device of this character.

To this end the invention consists in certain features of construction and combination of parts, as will be hereinafter fully described and claimed.

In the accompanying drawings I have illustrated my invention in the best form now known to me; but many changes in the details might be made within the skill of a good mechanic without departing from the spirit of the invention as set forth in the claims at the end of this specification.

The same reference characters indicate the same parts of the invention.

In said drawings, Figure 1 is a plan view of my improved whiffletree-hook. Fig. 2 is a longitudinal section of the same. Fig. 3 is a view showing the hook reversed.

1 denotes the singletree, and 2 a metal ferrule or socket shrunk on the outer end thereof and formed with the parallel ears 3 3, between which is fulcrumed the butt-end or shank 4 of the simitar-shaped hook 5 on the rivet-bolt 6, fixed in said ears.

7 denotes a longitudinal pocket or recess formed in said shank approximately parallel with the hook 5 and tangential to the bolt 6.

8 represents a coiled spring seated in said recess, and 9 a pin resting on said spring, with its free end abutting against the outer face of the socket, the tension of the spring being exerted through the medium of the pin to hold the free end of the hook 5 in contact with the contiguous face of the singletree, as shown in Fig. 1. When in this position, the hook may be turned outwardly, as shown in dotted lines in Fig. 2, and the end of the trace slipped over and the hook allowed to return to its normal position, so as to prevent the accidental displacement of the trace.

In Fig. 3 the position of the hook is shown as reversed in the socket, so that its free end rests against the outer end of the singletree, and thereby prevents the trace becoming detached.

Having thus fully described my invention, what I claim, and desire to secure by Letters Patent, is—

1. In combination, the socket 2 formed with the parallel ears 3 3, the hook 5 pivoted between said ears, and the spring-actuated pin 9 carried by said hook, substantially as shown and described.

2. In combination, the socket 2 formed with the parallel ears 3 3, the hook 5 pivoted between said ears and having its shank 4 formed with a pocket 7, and the spring-actuated pin 9 seated in said pocket with its projecting end in contact with said socket, substantially as specified for the purpose set forth.

In testimony whereof I have hereunto set my hand in presence of two subscribing witnesses.

HAKAN OLSON.

Witnesses:
NELS NELSON,
CHAS. A. NELSON.